Sept. 9, 1941.          D. R. CLARKSON          2,255,445
PRODUCTION OF SULPHURIC ACID AND IRON OXIDE FROM WASTE PICKLING ACID
Filed April 25, 1938
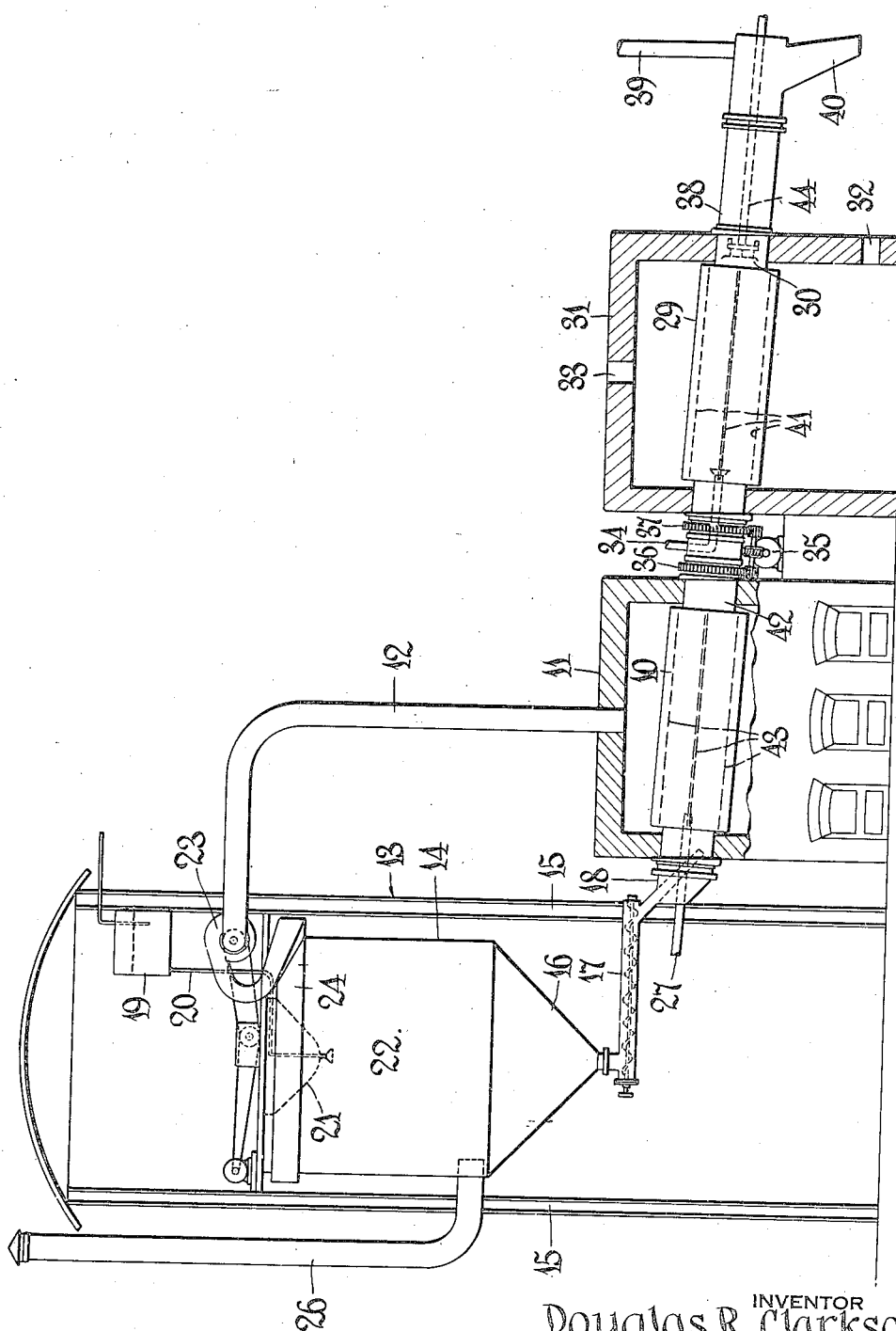
INVENTOR
Douglas R. Clarkson,
BY
Beau, Brooks, Buckley & Beau.
ATTORNEYS Patented Sept. 9, 1941

2,255,445

UNITED STATES PATENT OFFICE 2,255,445

PRODUCTION OF SULPHURIC ACID AND IRON OXIDE FROM WASTE PICKLING ACID

Douglas R. Clarkson, Buffalo, N. Y., assignor to Ella Van Gorder, Buffalo, N. Y.

Application April 25, 1938, Serial No. 204,250

6 Claims. (Cl. 23—168)

This invention relates to the treatment of waste pickling liquor and more particularly to the treatment of such liquors whereby the iron and sulphur values are separately obtained as commercially desirable products.

The problem of the disposal or treatment of waste pickling liquors is one that has been studied for many years but no practical solution acceptable to the industry has as yet been obtained. The solution to this problem is becoming increasingly vital as the production of iron and steel forms requiring pickling to loosen and remove oxide and scale formation has increased enormously in the last few years with, therefore, an attendant increase in the amount of waste pickling acid to be disposed of.

The waste pickle liquors are generally aqueous solutions of about 20 to 22.5 Baumé gravity, containing about 2 to 5% free sulphuric acid and about 30 to 35%, more or less, of dissolved salts calculated as ferrous sulphate heptahydrate.

In accordance with the procedure of the present invention the waste pickle liquor is first suitably treated to eliminate the free acid present in the spent solution. This acid is neutralized with scrap iron as a neutralizing agent as it is desired to recover the iron values as oxide. The neutralization of the acid is effected in any suitable sort of container although wooden vats in which the scrap iron may be placed and over and through which the waste pickle liquor may be circulated, are eminently suitable. The neutralization may be effected at ordinary or atmospheric temperatures although complete neutralization is effected more rapidly at elevated temperatures and to this end the solution may be heated, as for instance, by means of waste steam or flue gases and the like.

Although the reduction of free acidity is preferably produced by neutralization with scrap iron, it will be understood that alkaline materials, as for instance, lime or any other suitable alkali, may be employed. The addition of lime, however, is not as suitable as neutralization with scrap metal due to the fact that the resultant iron values are thus contaminated with the added alkali and with this in view it will be understood that scrap iron is the preferred neutralizing agent.

Subsequent to neutralization of the waste pickle liquor, the solution has acquired a Baumé gravity of about 27.5 and contains about 37%, more or less, of ferrous sulphate calculated as heptahydrate. This free salt is obtained by removal of the water by a suitable evaporation procedure. Water elimination may be effected by surface evaporation in vats with the production of crystals of ferrous sulphate heptahydrate or copperas, and this procedure may find application where the quantity of liquor to be evaporated is not unduly large. However, in usual installations the quantities of pickle liquor will be of substantial volume and surface evaporation and slow crystallization will not be found feasible, in which event, the salt solution is evaporated, as, for instance, by spray drying with production of a finely powdered ferrous sulphate monohydrate.

In the spray drying operation the concentrated, neutralized spent pickle liquor is atomized in the presence of a heated fluid, as, for instance, air or steam, whereby a flash removal of the water is obtained with the production of fine particles of ferrous sulphate monohydrate. However, in the preferred procedure hot gases from the roasting furnace, about to be described, for decomposing the ferrous sulphate are employed for this purpose as there is ample heat from this source for water evaporation. The moist gases evolved during spray drying still carry considerable heat and as a small proportion of powdered salt is carried along, this is recovered by passage of the heated gases upwardly through a tower down which a portion of the pickling solution is allowed to trickle, thus absorbing any solid material, and otherwise scrubbing the gases and, in addition, preheating this pickling solution prior to its flow to the spray dryer.

The powdered crystalline ferrous sulphate monohydrate which collects in the spray dryer is then, in accordance with the present invention, further treated to obtain the iron and sulphur value. To this end the powdered salt is removed from the spray dryer and passed, together with an oxygen containing gas, such as air, through a heating zone having a plurality of temperatures, the temperature at the entrance portion of the zone being higher than that of the exit portion and being graded downwardly thereto. Upon introduction to the heated zone, the salt is heated to a temperature sufficient to effect decomposition thereof with the production of oxide of iron as a solid product of decomposition, the sulphur value being evolved as a gaseous product of decomposition consisting of sulphur dioxide and sulphur trioxide. In general, this decomposition temperature is above about 550° C. and below about 700° C. and preferably in the neighborhood of about 600 to 700° C., although the temperature may be somewhat higher. In accordance with the present invention it is desired to recover the sulphur values as sulphur trioxide, and to this end the ferrous sulfate is subjected to the lowest temperature consistent with decomposition in order to retain as large a percentage of evolved sulphur as sulphuric anhydride. This decomposition is effected in the presence of excess of air as an oxidizing agent whereby the oxide of iron thus produced is present in sufficient quantity to change the sulphurous anhydride to sulphuric anhydride.

To effect transformation of sulphurous anhydride to sulphuric anhydride, the iron oxide produced by decomposition of ferrous sulphate monohydrate and employed as a catalyst to hasten the transformation and contact of the evolved gases containing sulphur dioxide and sulphur trioxide, together with excess air, is maintained in contact with the solid decomposition product of the ferrous sulphate monohydrate at a temperature below about 700° and above about 450°, the preferred temperature of contact being about 550° C. In order to obtain this desirable conversion, concurrent flow of the ferrous sulphate monohydrate, the solid decomposition product thereof, air and the gases evolved from the salt are maintained at all times during passage through the heated zone to insure catalytic contact between the solid product of decomposition of the ferrous sulphate monohydrate, sulphurous anhydride and oxygen.

In addition to maintaining concurrent flow of these materials, the catalyst is kept in a finely divided condition whereby an enlarged surface thereof is exposed for catalytic action. The catalytic action is further enhanced by continuously sifting or dropping the salt and its solid product of decomposition through the gases evolved from the salt and the excess air mixed therewith. The quantity of catalyst, therefore, in constant contact with the mixed gases, increases continuously during passage through the heated zone and at the discharge end of the chamber is in greatest concentration where there exists the greatest quantity or concentration of sulphuric anhydride, the least concentration of sulphurous anhydride and where the temperature of the heating zone is at the lowest gradient.

In order that the invention may be better comprehended, a form of apparatus has been illustrated in the accompanying drawing in which the present invention may be performed.

A suitable roasting furnace such as a rotary calciner is shown at 10 externally heated by the surrounding furnace 11 by means of suitable fuel such as coke, producer gas, and the like. The sensible heat of the products of combustion is withdrawn from the furnace by means of the flue 12 and transported for use in a spray drier in the flue 12. The spray drier is generally shown and designated at 13.

Practical operating procedure dictates that the discharge from the spray drier be elevated above the inlet of the calcining furnace and, as shown in a typical installation, the drying chamber 14 is supported by uprights 15 at a sufficient height so that discharge cone 16, from which solid material is withdrawn and discharged into screw conveyor 17, will feed the solid product from the spray drier by gravity into the feed end 18 of calcining furnace 10.

A constant level supply tank 19 is supported adjacent the top of the spray drier in which a constant head of neutralized spent pickle liquor is maintained. The spent solution flows from tank 19 through conduit 20 to a spraying mechanism 21 discharging into the actual drying portion or chamber 22 of the spray drier. Sufficient gas for evaporating the liquid portions of the spent liquor is withdrawn by means of fan 23 from furnace 11 through conduit 12 and discharged through flue 24 into the drying chamber per se.

Very rapid and efficient drying occurs in this chamber, the vaporized material and drying gases being withdrawn through flue 26. The solid product, sulphate monohydrate, collects in cone 16 and is fed into the rotary furnace.

Rotary calcining furnace 10 is equipped with an air inlet 27 whereby air in controlled quantities can be admitted to furnace 10.

The temperature of furnace 10 is maintained sufficiently high to effect decomposition of the ferrous sulphate with the production in the presence of excess air of ferric oxide, sulphur dioxide and sulphur trioxide. In order to insure rapid removal of the evolved gaseous oxides of sulphur, movement of air through rotary furnace 10 is caused to occur under good draft and at reasonably good velocity.

Both the solid and gaseous products of decomposition of the ferrous sulphate are discharged from furnace 10 into a catalyst chamber 29 formed generally as a rotating chamber. The catalyst chamber is formed with a reduced discharge exit 30 whereby excess of the products of decomposition of ferrous sulphate are maintained in the furnace. The interior of the catalyst chamber is equipped with means for carrying the solid decomposition product of ferrous sulphate upwardly in the chamber and dropping the same through the chamber. The physical state of subdivision of the ferrous sulphate produced by spray drying of the spent pickle liquor insures ready and rapid decomposition of the ferrous sulphate at the decomposition temperature, with the production of iron oxide in a finely divided form and in a form where the oxide is an active catalyst for causing reaction between sulphur dioxide and oxygen with the production of sulphur trioxide.

The catalyst chamber is placed within the housing 31 and is equipped with a controllable air entrance 32 and exit 33 so that the temperature of the chamber may be regulated to a temperature between about 400–550° C.

In order to insure the presence of sufficient excess oxygen an auxiliary air entrance is provided at 34 for discharging air into the catalytic chamber. As the gases which comprise a mixture of air, sulphur dioxide and sulphur trioxide, travel from the calcining furnace 10 into the catalytic chamber 29 and mix with the air admitted through conduit 34, the temperature is reduced and rapid conversion of sulphur dioxide to trioxide takes place due to contact with the heated catalyst falling from the top of the catalytic chamber to the bottom upon rotation of this chamber. As this catalyst is moved toward the exit end of the chamber, the temperature thereof is decreased and complete conversion of the sulphur dioxide is obtained since an excess of catalyst is present at the exit end of the catalytic chamber. A temperature regulation of the temperature within the catalytic chamber is automatically controlled by valve means operated automatically, which means are not shown as they are conventional, and the temperature of the catalyst chamber maintained at a relatively high point at the entrance side of the chamber and relatively low at the exit side, the temperature range being from about 575 at the entrance side to about 375 at the exit side.

Power operating means are provided at 35 for rotating roasting furnace 10 and catalyst chamber 29 through ring gears 36 and 37.

The solid product and gaseous products of decomposition of the ferrous sulphate are moved concurrently through the decomposition chamber, the catalytic chamber and are concurrently withdrawn at the exit 38. The temperature in this portion of the apparatus is maintained above about 300 to prevent condensation of sulphur trioxide, the latter being withdrawn through 39 and absorbed in the usual manner in concentrated sulphuric acid, the solid product being withdrawn at 40.

In order to maintain excess of solid in the catalyst chamber the discharge orifice 30 is restricted, or conversely the diameter of the mid portion of chamber 29 is enlarged. This portion of the device is equipped with fins 41 for carrying solid upwardly upon rotation of chamber 29 and dropping the solid through the gaseous medium therein.

The calcining furnace is also provided with a reduced exit orifice at 42 for retarding passage of ferrous sulphate therethrough, thus insuring complete decomposition thereof. Furnace 10 is also equipped with fins 43 for dropping solid product through the gases in this furnace and to insure contact of any solid product of decomposition with gases in this portion of the furnace.

An additional air entrance duct 44 is provided in the discharge end 38 to reduce the temperature in this portion of the furnace should it be found desirable to do so to prevent decomposition of sulphur trioxide.

From the foregoing, it will be seen that the present invention provides a means for treating spent pickle liquor with the recovery of the iron and sulphur values in practical form.

What is claimed is:

1. The method of treating ferrous sulphate from waste pickling liquors for obtaining separately the metal and non-metal values thereof which comprises passing the ferrous sulphate and an oxygen containing gas through a heating zone having a progressively decreasing temperature, whereby the ferrous sulphate is decomposed to a solid decomposition product of ferric oxide and a gaseous decomposition product containing sulphur dioxide, moving the products of decomposition in contact with one another and concurrently through the zone toward the lower temperature, introducing additional unheated oxygen containing gas into said zone at the portion of lower temperature thereof and sifting the ferric oxide through the gases in that portion of the zone having greatest concentration of sulphur trioxide.

2. The method of treating ferrous sulphate from waste pickling liquors for obtaining separately the metal and non-metal values thereof which comprises passing the ferrous sulphate and an oxygen containing gas through a heating zone having a progressively decreasing temperature, whereby the ferrous sulphate is decomposed to a solid decomposition product of ferric oxide and a gaseous decomposition product containing sulphur dioxide, moving the products of decomposition in contact with one another and concurrently through the zone toward the lower temperature, introducing additional unheated oxygen containing gas into said zone at the portion of lower temperature thereof and sifting the ferric oxide through the gases in that portion of the zone having greatest concentration of sulphur trioxide, removing the solid and gaseous products concurrently from the zone and thereafter passing the gaseous products over and in contact with sulphuric acid.

3. The method of treating ferrous sulphate from waste pickling liquors for obtaining separately the metal and non-metal values thereof which comprises passing the ferrous sulphate and an oxygen containing gas through a heating zone having a plurality of temperatures, one temperature being sufficient to decompose the ferrous sulphate into a gaseous decomposition product containing sulphur dioxide and a solid decomposition product, another temperature lower than said first temperature favoring the oxidation of sulphur dioxide to sulphur trioxide introducing additional unheated oxygen containing gas into said zone of lower temperature in amounts to compensate for the exothermic reaction there occurring and to maintain the temperature at the lower gradient and discharging the solid product and gaseous product concurrently from the heating zone.

4. The method of treating ferrous sulphate from waste pickling liquors for obtaining separately the metal and non-metal values thereof which comprises passing the ferrous sulphate and an oxygen containing gas through a heating zone having a plurality of temperatures, one temperature being sufficient to decompose the ferrous sulphate into a gaseous decomposition product containing sulphur dioxide and a solid decomposition product, another temperature lower than said first temperature favoring the oxidation of sulphur dioxide to sulphur trioxide introducing additional unheated oxygen containing gas into said zone of lower temperature in amounts to compensate for the exothermic reaction there occurring and to maintain the temperature at the lower gradient, continuously dropping the solid product of decomposition through the gases in said zone of lower temperature and discharging the solid product and gaseous product concurrently from the heating zone.

5. The method of treating ferrous sulphate from waste pickling liquors for obtaining separately the metal and non-metal values thereof which comprises passing the ferrous sulphate and an oxygen containing gas through a heating zone having a plurality of temperatures, one temperature being sufficient to decompose the ferrous sulphate into a gaseous decomposition product containing sulphur dioxide and a solid decomposition product, another temperature lower than said first temperature favoring the oxidation of sulphur dioxide to sulphur trioxide maintaining in said zone of lower temperature an amount of solid product of decomposition in considerable excess over the amount corresponding to the gaseous product of decomposition in said zone, introducing additional unheated oxygen containing gas into said zone of lower temperature and discharging the solid product and gaseous product concurrently from the heating zone.

6. The method of treating ferrous sulphate from waste pickling liquors for obtaining separately the metal and non-metal values thereof which comprises passing the ferrous sulphate and an oxygen containing gas through a heating zone having a plurality of temperatures, one temperature being sufficient to decompose the ferrous sulphate into a gaseous decomposition product containing sulphur dioxide and a solid decomposition product, another temperature lower than said first temperature favoring the oxidation of sulphur dioxide to sulphur trioxide maintaining in said zone of lower temperature an amount of solid product of decomposition in considerable excess over the amount corresponding to the gaseous product of decomposition in said zone, introducing additional unheated oxygen containing gas into said zone of lower temperature, continuously dropping the solid product of decomposition through the gases in the zone of lower temperature and discharging the solid product and gaseous product concurrently from the heating zone.

DOUGLAS R. CLARKSON.